United States Patent
Roudaut

[11] Patent Number: 5,201,838
[45] Date of Patent: Apr. 13, 1993

[54] POSITION INDICATOR FOR A PISTON CONTROLLED ROBOT PART

[76] Inventor: Philippe Roudaut, 142, rue du Général Leclerc, F-95120 Ermont, France

[21] Appl. No.: 887,583

[22] Filed: May 20, 1992

Related U.S. Application Data

[63] Continuation of Ser. No. 578,427, Sep. 5, 1990, abandoned.

[30] Foreign Application Priority Data

Sep. 5, 1989 [FR] France .................. 89 11732

[51] Int. Cl.⁵ .................. B25J 19/02; G01R 33/06
[52] U.S. Cl. .................. 294/88; 294/907; 324/207.2; 324/207.22; 414/730; 901/46; 901/31
[58] Field of Search .................. 324/207.2-207.26, 324/235, 260, 262; 901/9, 40, 34, 46, 50, 31; 116/204; 338/32 H, 32 R; 294/88, 907; 414/730

[56] References Cited

U.S. PATENT DOCUMENTS

| | | | |
|---|---|---|---|
| 4,107,604 | 8/1978 | Barnier | 324/207.2 |
| 4,385,297 | 5/1983 | Schmitt et al. | 324/207.16 |
| 4,555,120 | 11/1985 | Frait et al. | 324/207.2 |
| 4,658,214 | 4/1987 | Petersen | 324/207.24 |
| 4,723,503 | 2/1988 | Yada | 116/204 |
| 4,730,861 | 3/1988 | Spencer | 294/86.4 |
| 4,793,241 | 12/1988 | Mauo et al. | 324/207.24 |
| 4,836,578 | 6/1989 | Soltis | 324/207.24 |
| 5,004,391 | 4/1991 | Burdea | 294/88 X |
| 5,022,695 | 6/1991 | Ayers | 294/88 |

FOREIGN PATENT DOCUMENTS

| | | |
|---|---|---|
| 2945895 | 5/1981 | Fed. Rep. of Germany ........ 324/207.24 |
| 3510252 | 9/1986 | Fed. Rep. of Germany . |
| 8632990 | 4/1987 | Fed. Rep. of Germany . |
| 2163260 | 2/1986 | United Kingdom ........ 324/207.24 |
| 87/06656 | 11/1987 | World Int. Prop. O. ...... 324/207.24 |

Primary Examiner—Gerard R. Strecker
Assistant Examiner—Warren S. Edmonds
Attorney, Agent, or Firm—Laff, Whitesel, Conte & Saret

[57] ABSTRACT

A piston-cylinder assembly is equipped with means for determining and validating the piston position of that assembly part of a robot. A piston 1 slides axially in a cylinder 2, and moves a permanent magnet 13. The resulting magnetic field is sensed by a Hall effect transistor. A member 12 is controlled by a program of analog signals coming from the sensor. When the run of piston 1 is stopped, the position of that piston is one of the positions that have been previously determined and memorized by control member 12.

3 Claims, 4 Drawing Sheets

POSITION INDICATOR FOR A PISTON CONTROLLED ROBOT PART

This application is a continuation of application Ser. No. 07/578,427, filed Sep. 5, 1990, now abandoned.

The invention relates to a piston-cylinder assembly equipped with means to determine and validate the position of a piston, especially of a piston that is part of a piston-cylinder assembly such as that of a jack or that of a stop-motion device for the validation of the end-of-run of a movable element equipping a robot. In the case of a jack piston, this may be a piston used in pneumatic prehension pincers, especially prehension pincers for a manipulator robot.

The manipulator robots generally are made up of prehension pincers affixed to the end of arms and serving to transport parts, one at a time, from one station to another. These manipulator robots are governed by programmed automata that govern, in sequence, the different jacks of these robots according to predetermined drive phases. Upon reception of an electric or of a pneumatic signal that validates the end of a phase, the automaton sets the next phase into motion.

In the case of a validation of the end-of-run of a movable element that equips a robot, it is well known to use a piston-cylinder assembly the piston of which acts on a switch when it reaches the end of its run. The document FR-A-2 605 686 describes a piston-cylinder assembly of that type. The piston is equipped, in the external area, with a permanent magnet that acts, at the end of the run, on a switch actuated without contact by the magnetic field of the magnet.

In order to speed up the succession of phases, it may prove interesting to supply, in addition to the signal for the end-of-run of the piston, a signal that in some way warns the automaton that the end of the run is near. Upon receiving that additional signal, the automaton starts preparing the next phase that it will really and effectively start only upon receiving the signal validating the end-of-run. In order to obtain that result, it is possible to think of using two switches, one of them being slightly shifted relative to the other. That solution has the drawback that the adjusting of the position of one switch relative to the other cannot be rapidly and simply modified.

It has been thought of using magnetic field sensors the characteristic of which is to supply to their terminals a voltage that is proportional to the magnetic field prevailing at the point of detection. That voltage is sent to comparators the threshold values of which represent predetermined positions of the piston. The comparators give out logical signals that are directly used by the automaton.

This system, with magnetic field sensors, presents problems of bulk connected to the positioning of the potentiometers used to adjust the threshold values of the comparators. In addition, for reasons of ease at the time of adjusting the validation position, and therefore of adjusting the threshold values, these potentiometers cannot be placed close to the piston-cylinder assembly that is sending the validation signals to the automaton. Besides, if they are placed on the control panel of the automaton, the electric connection between the piston-cylinder assembly and the automaton that conveys analog signals issued from the sensors and that have low voltage levels. Furthermore, because statics unavoidably interfere with that connection, these signals may show a signal to noise ratio high enough to prevent them from being transmitted in a dependable manner.

Besides, that system lacks flexibility. Indeed, the fact of adding a new validation position to the piston-cylinder assembly implies adding a new comparator, a new potentiometer and new wires between the piston-cylinder assembly and the automaton.

Let us note, finally, that everything heretofore said also applies to a piston-cylinder that constitutes a jack equipped with a device for the determination and the validation of the position of the piston, such as those that equip prehension pincers in a manipulator robot.

The purpose of the present invention, therefore, is to provide a piston-cylinder that is equipped with the means to determine and to validate the position of the piston, and that does not have the above-mentioned drawbacks.

The present invention consists of a piston-cylinder assembly that comprises a piston capable of axially sliding inside a cylinder, that piston being extended, in the direction of its axis, by a rod that projects from the forward bottom of the cylinder, a permanent magnet that is coming as one piece with the piston, creating a magnetic field that is measured by a linear magnetic field sensor working by Hall effect; the voltage supplied by the sensor then serving to create validation signals for an automaton.

According to a characteristic of the invention, that piston-cylinder assembly further comprises, set inside a lodging provided in the cylinder, an electronic board on which there are mounted on the one part linear sensors working by Hall effect and, on the other part, a member for the programmed control of the analog signals coming from the sensor or sensors, that supplies to the automaton logical signals that, at the time of the interruption of the piston run, validate the position of that piston in one of the positions that have been pre-determined and memorized by the controlling member.

The fact of mounting the sensors and the controlling member on a board that is set into a lodging provided inside the cylinder solves the bulk problems indicated above. Indeed, the adjusting of the threshold values no longer is done by potentiometers, but by a programming of the controlling member.

Besides, the connection of that member to the automaton conveying the logical is in the immediate vicinity of the piston signals, and this is, therefore, less sensitive to noise.

According to another characteristic of the present invention, the controlling member is constituted by a micro-controlling device comprising input ports to which are connected the sensor or sensors working by Hall effect, as well as the automaton, and output ports connected to the automaton, and by at least one memory that stores the programs for the tasks that the micro-controlling device must carry out.

According to another characteristic of the invention, on the electronic board there is mounted only one linear sensor working by Hall effect.

According to another characteristic of the invention, the piston-cylinder assembly thus equipped constitutes a stop-motion device that validates the end-of-run.

According to another characteristic of the invention, on the electronic board there are mounted two linear sensors working by Hall effect.

According to another characteristic of the invention, that piston-cylinder assembly constitutes a pneumatic jack of prehension pincers for a manipulator robot, and the electric and logical signal supplied to the automaton serves as validation signal for the taking by these fingers of a piece according to one of its dimensions.

The above-mentioned characteristics of the invention, as well as others, will appear more clearly upon reading the following description of a preferred example of execution of the invention, said description being given in connection with the attached drawing in which.

Figure 1:
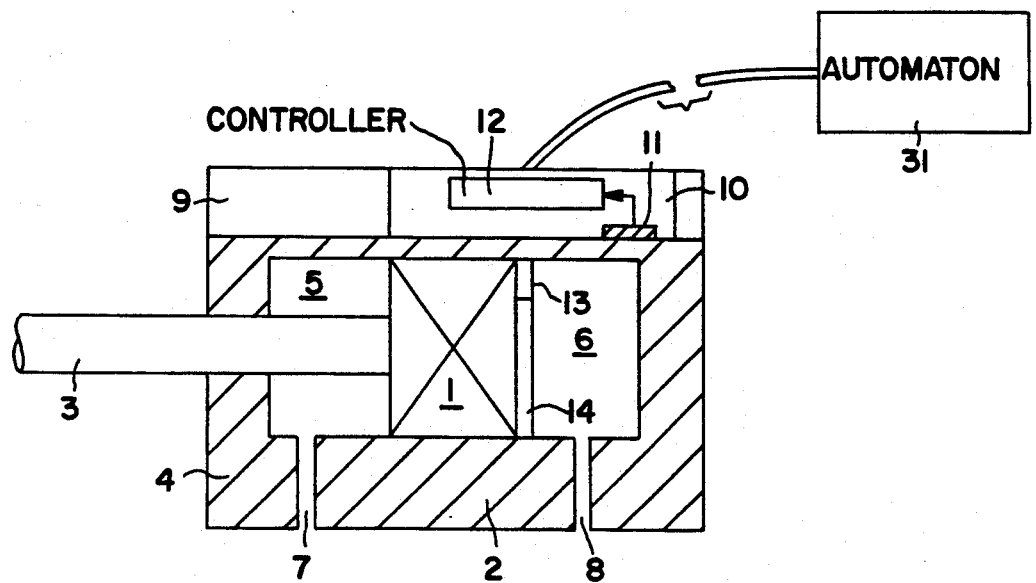
FIG. 1 is a schematic view of a piston-cylinder assembly according to the present invention, equipped with a single magnetic field sensor.

The assembly shown in FIG. 1 essentially comprises a piston 1 capable of axially sliding inside a cylinder 2. Piston 1 is extended, in the direction of its axis, by a rod 3 that projects from the forward bottom 4 of cylinder 2.

The cylinder 2 and the piston 1 form two chambers, 5 and 6 respectively, that are either pneumatically or hydraulically connected to the outside by two ducts, 7 and 8. The piston-cylinder assembly can form a double-action jack and the two ducts 7 and 8 then make possible the sending of fluid under pressure into one or the other of the two chambers 5 and 6. A piston-cylinder assembly of that type can be used to govern the fingers of prehension pincers of a manipulator robot. It may also form a stop-motion device that validates the end-of-run of a movable element with which such a robot is equipped. The two ducts 7 and 8 then make it possible to maintain the two chambers 5 and 6 under the same pressure during the displacement of piston 1 inside cylinder 2.

Parallel to the main axis of the piston-cylinder assembly 1, 2, and on the external surface of cylinder 2, there is found a groove 9 in which there is set an electronic card 10 on which are mounted both a magnetic field sensor 11 working with Hall effect, and a governing member 12. The sensor 11 working with Hall effect advantageously is of the linear type, that is to say it supplies to its terminals a voltage that is proportional to the intensity of the magnetic field that prevails at the point of detection. That magnetic field has as its source a permanent magnet 13 that is mounted on the face of the piston that is opposite rod 3, face 14. That magnet 13 could be fixed to any other location provided that it be made of one piece with piston 1 and act on sensor 11 in a manner such that the latter will deliver a voltage that is directly proportional to the run of the piston.

Figure 2:
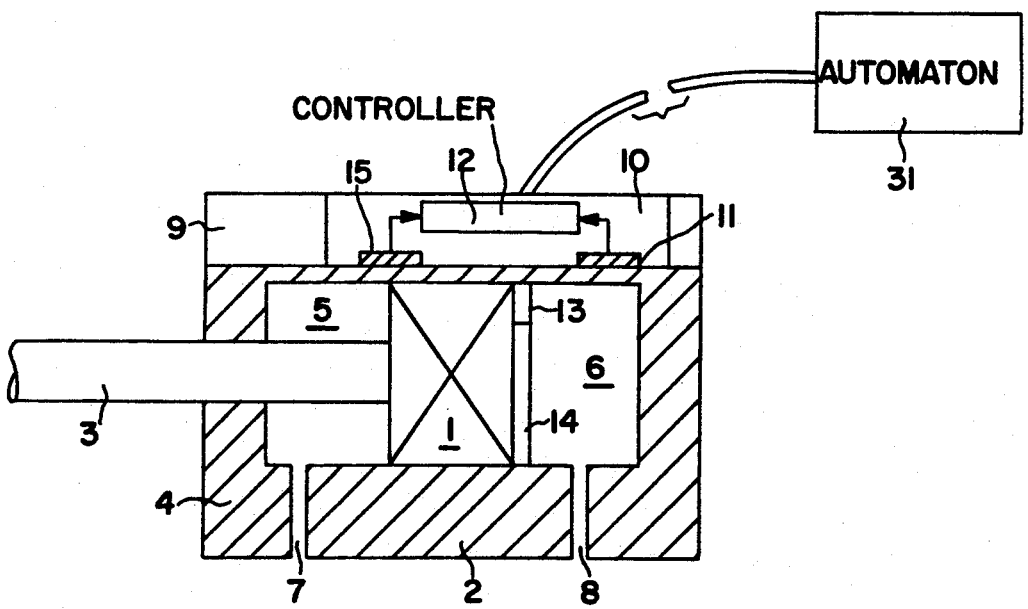
FIG. 2 is a schematic view of a piston-cylinder assembly according to the present invention, equipped with two sensors.

There is shown in FIG. 2 a variation in the execution of the present invention. In that figure, the same elements as those in FIG. 1 are indicated by the same reference symbols. Two sensors 11, 15, working with Hall effect, also of the linear type, are mounted on the electronic board and each one of these delivers a measuring voltage to the governing member 12. That form of execution, with two sensors, is preferred when the run of the piston is important. Indeed, experience has shown that the sensors with Hall effect are sensitive enough to permit a correct use of the signal they supply only with piston runs of the order of a few millimeters, when the permanent magnets used are taken into consideration. When the piston runs are more important, of the order of a few tens of millimeters, the use of two sensors becomes necessary, each one of them measuring a part of the run only.

Figure 3:
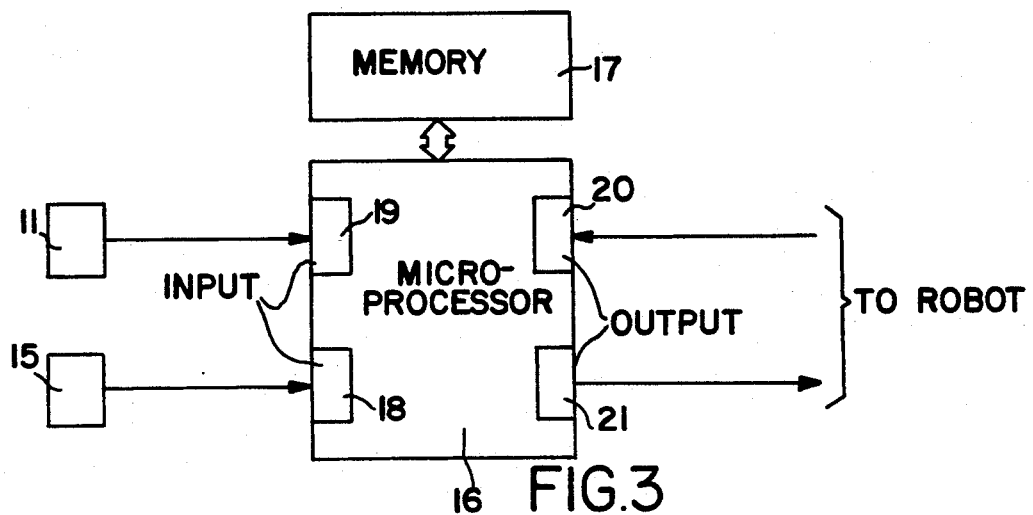
FIG. 3 is a diagram of the electronic board that equips a piston-cylinder assembly according to the invention.

An electric diagram of the electronic board is shown in FIG. 3. The main element of that board is a microcontroller 16 that is an integrated electronic component the functioning of which is bound to a program written into memory 17, of the EEPROM or EPROM type for example, to which it is connected. This microcontroller 16 is equipped with input ports 18 and 19, capable of receiving analog voltages, with at least one input port 20 capable of receiving logical levels signals, and with at least one output port 21 capable of delivering logical signals. This microcontroller is, for example, a microcontroller having reference No. 87 C 752 and sold by the Philips Corporation. I offers the advantage, over other microcontrollers that might be suitable here, of being small in size. In memory 17 there are stored the different steps of the program. At each step, the microcontroller performs an operation that may be either reading the voltage present at port 18 or at port 19, comparing one of the voltages read in a previous step with memorized or computed threshold values, reading a logical level present at port 20, or even supplying a level to port 21, a level that is dependent, for example, on operations performed during a previous step. The two imput ports 18 amd 19 receive the measurement signals from the sensors 11, 15 working with Hall effect. One of the input ports 20 of the logical type receives governing signals from an automaton 31 These governing signals serve to supply the microcontroller 16, through the single automaton, with the threshold values that it uses to determine the piston positions it is to validate. The output port 21 produces logical levels signals that are transmitted to the automaton and that serve for the validation of the piston position in one of the positions that have previously been memorized.

Automaton 31 is the member that memorizes the different phases of a cycle to be performed by the robot, and that governs, for each phase, the suitable pneumatic jack or jacks. A new phase is launched as soon as the automaton has received, either from the jack itself or from the validation stop-motion device, logical signals that inform it regarding the progress and/or the completion of the phase going on.

Figure 4A:
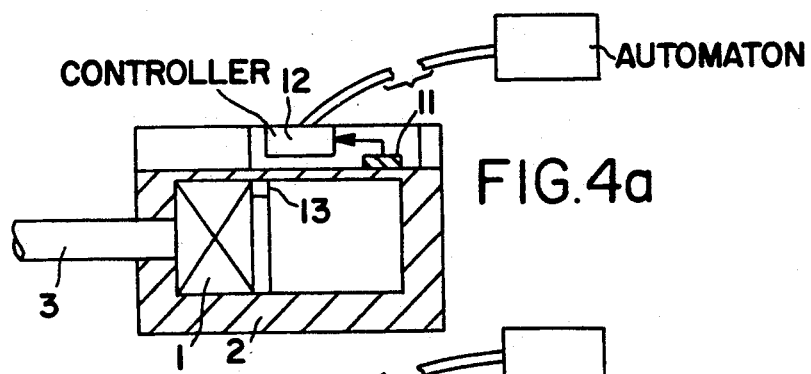
FIGS. 4a to 4c show the functioning of a piston-cylinder assembly such as shown in FIG. 1.
Figure 4B:
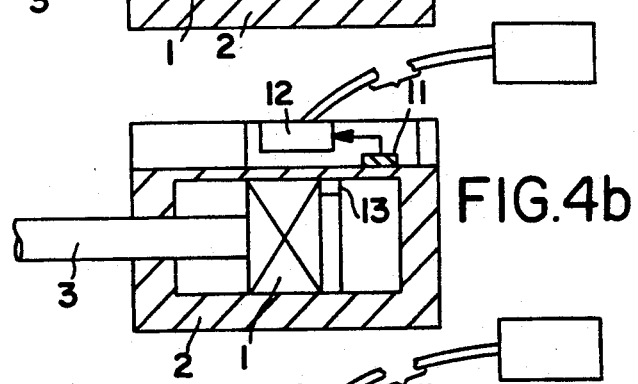
Figure 4C:
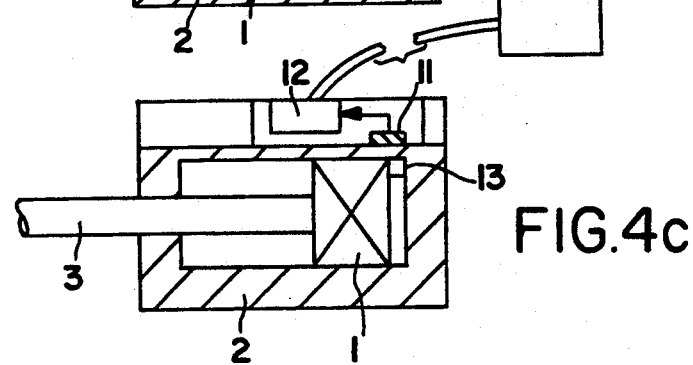

The functioning of the piston-cylinder assembly equipped with means for the determination and the validation of the piston position, such as shown in FIG. 1, is now described with respect to FIGS. 4a to 4c.

Let us remember that this assembly has one sensor only and that it is therefore suitable to be used as a stop-motion device for the end-of-run validation.

When piston 1 is in forward position, FIG. 4a (it may be held there by a spring that is not shown), the permanent magnet 13 acts only weakly on the linear sensor 11 that, as a result, sends only a low voltage to the microcontroller 16. When piston 1 moves toward the rear, either because a mobile element such as for example the actuating arm of a robot, presses on the external end of rod 3, or because piston 1 is subjected to an excess pressure on its rod side face, that piston reaches the position shown in FIG. 4b, in which the influence of the permanent magnet 13 on sensor 11 is increased as compared to that of the previous position. The voltage delivered by sensor 11 increases. It is supplied to the microcontroller 16 that compares it with a threshold value memorized when the automaton was programmed. Once that threshold value has been exceeded, this possibly being the case in FIG. 4b, the microcontroller sends a logical signal to the automaton 31 that then can start to prepare the following phase. When piston 1 reaches the end of its run, FIG. 4c, the influence of magnet 13 on sensor 11, as well as the voltage at the terminals of that sensor 11, are at a maximum. The microcontroller 16 compares that voltage to a second threshold value that is reached when the piston is at the end of its run. At that time, it sends to the automaton a second logical signal that corresponds to an end-of-run validation of the piston. The automaton then can set the next phase into motion.

Thus, by using a microcontroller capable of storing several threshold values, the preparation of a phase can be moved forward with respect to the actual starting of that phase.

Figure 5:
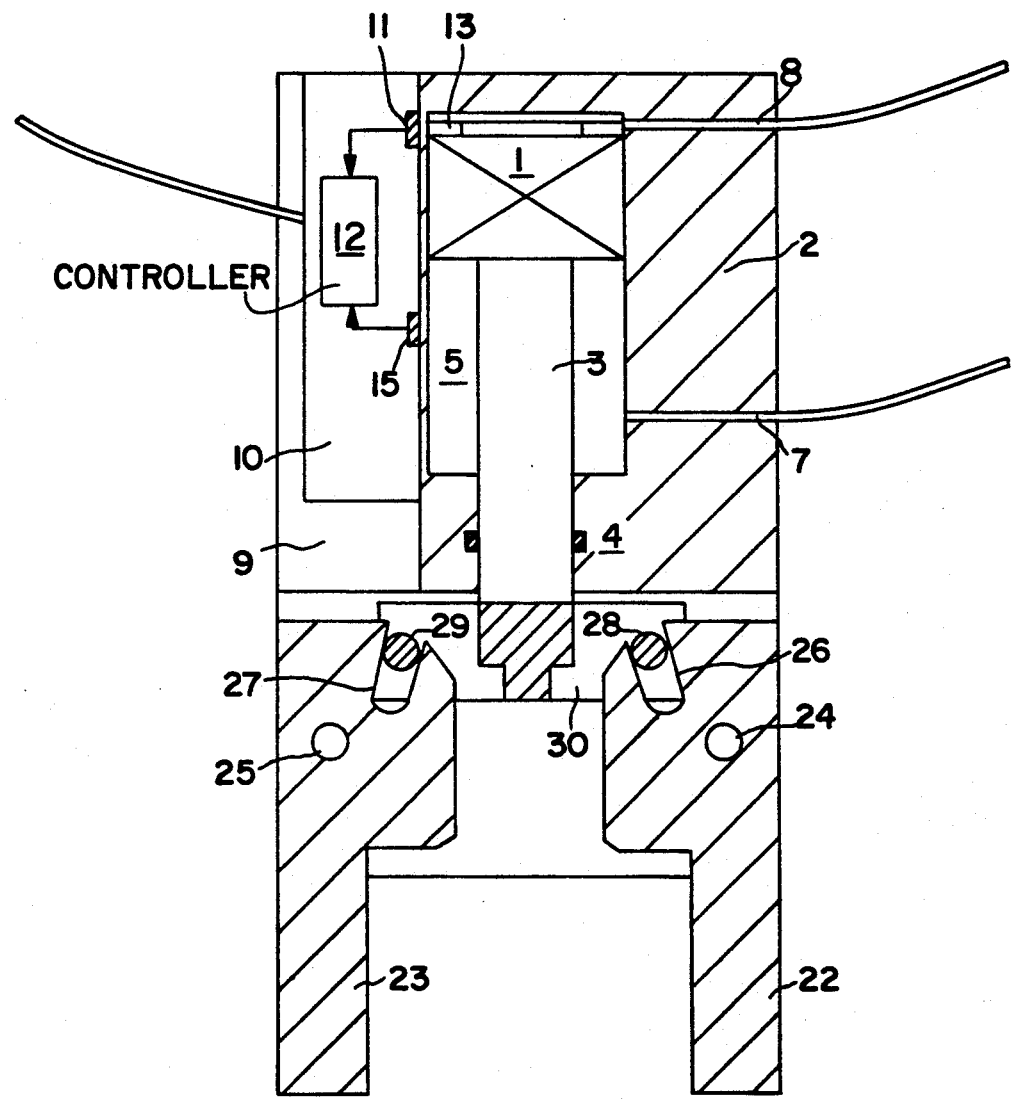
FIG. 5 shows prehension pincers that make use of a piston-cylinder assembly such as the one shown in FIG. 2, and FIGS. 6a and 6b show the functioning of pincers equipped with a piston-cylinder assembly according to the present invention.

In FIG. 5, there are shown pneumatic prehension pincers comprising a piston-cylinder assembly equipped with two linear sensors 11, 15 working with Hall effect. In that Figure, the elements that are the same as in the preceding figures are identified with the same reference numbers. Those pincers have two fingers 22, 23 capable of pivoting around two shafts 24, 25. In grooves 26, 27, that are provided in the upper part of fingers 22, 23, above the two shafts 24, 25, two bars 28, 29 affixed to a maneuvering member 30, can slide to drive along the fingers 22, 23. That maneuvering member comes as one piece with rod 3 that is driven along by a piston 1 sliding inside a cylinder 2 itself radially pierced with two holes 7, 8 that act as intakes for pressurized air. That piston-cylinder assembly constitutes a double-action jack pneumatically driven by the air sent into the holes 7 and 8.

The functioning of pincers of that type is described, for example, in document FR-A-2 638 670. Let us only recall, here, that the linear displacement of rod 3, that results from the excess pressure of air on one of faces of piston 1, causes the displacement of the maneuvering member 30 that, by means of bars 28, 29, causes the fingers 22, 23 to pivot, the latter then opening or closing, depending on the piston face that received the excess pressure.

The pincers shown in FIG. 5 are of the pivoting finger type. The invention also applies to pincers the fingers of which open and close by means of a lateral translation displacement.

In a groove 9 provided for in cylinder 2, there is fixed the electronic board 10 with its controlling member 12 and its two linear sensors 11, 15 of the magnetic field.

Figure 6B:
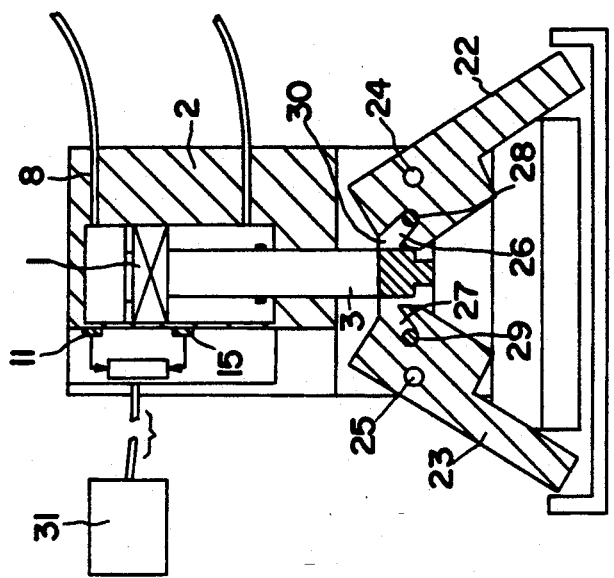
Figure 6A:
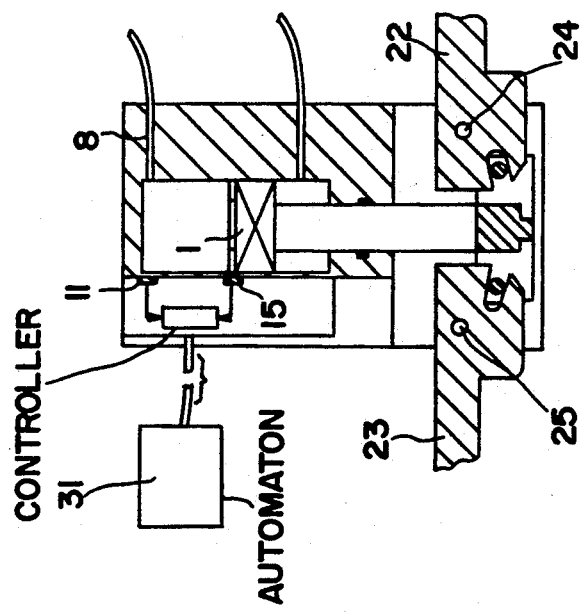

In FIG. 6a, the pincers are completely open. Sensor 11 delivers to the microcontroller 16 a very low voltage while sensor 15 is delivering a maximal voltage to it. The automaton, in the phase in progress, can govern the closing of the pincers fingers. The sending of air into duct 8 then permits the slow rising of piston 1. The two voltages delivered by the sensors 11, 15 slowly change until the time when, the fingers coming in contact with the piece to be held tight, FIG. 6b, they become constant. The microcontroller then compares them with threshold values that have been memorized during the programming phase and it sends to the automaton a signal the logical level of which is representative of the result of that comparison. The automaton, depending on its programming, then sends to the pincers, but also to other members it governs, suitable pneumatic orders.

For example, if the measured voltages correspond to the threshold values for the grabbing of the piece in direction of its length, the automaton only order the tightening of the piece while, if these voltages correspond to a grabbing in the width direction it orders, after that tightening, a 90° rotation. It can be seen, from this example, that the use of a microcontroller capable of storing several threshold values, makes it possible to position the tightened piece and to prepare it for the next phase, whatever the manner in which the first grabbing was carried out. Indeed, if that grabbing is incorrect, it can order a new one, and that until it becomes correct. Thus, in the case in which the voltages measured at the time the fingers stop do not correspond to any memorized value, the microcontroller sends to the automaton a logical signal that the latter interprets according to its programming. Same then can order the sudden opening of the fingers then, again, their closing and the tightening of the piece, and that until the grabbing is correct, that is to say when the voltages measured at the stopping of the fingers on the piece correspond to values that have been memorized by the microcontroller.

I claim:

1. A piston-cylinder assembly comprising a piston (1) capable of axially sliding in a cylinder (2), at least one permanent magnet (3) which is mounted as one piece with the piston (1), one or more Hall effect linear magnetic sensors (11, 15) mounted on the cylinder (2), said sensors being responsive to magnetic field of said permanent magnet (3) and delivering signals corresponding to positions of said piston (1) in the cylinder (2), a programmable control device (12), an automaton (31) which controls a robot according to the position of the piston (1) in the cylinder (2), a microcontroller (16) having input ports (18, 19, 20) respectively connected to said sensors (11, 15) and at least one output port (21) connected, via a digital link to said automaton (31), said control device (12) having at least a memory wherein data calculated by said control device (12) are stored or received from the automaton (31), said data being representative of predetermined positions of the piston (1) in said cylinder (2), said control device (12) supplying validation signals to the automaton, said validation signals being in a first state when the piston (1) stops in a position in which the signals delivered by the sensors (11, 15) correspond to data that has been previously stored in the control device memory, and being in a second state when the piston (1) stops in a second position in which the signals delivered by the sensors (11, 15) do not correspond to data previously stored in the control device memory.

2. A prehension pincer having a pair of fingers (22, 23) an assembly comprising a piston (1) capable of axially sliding in a cylinder (2) to drive said fingers (22, 23), at least one permanent magnet (3) which is mounted as one piece with the piston (1), one or more Hall effect linear magnetic sensors (11, 15) mounted on the cylinder (2), said sensors being responsive to a magnetic field of said magnet (3) and delivering signals corresponding to positions of said piston (1) in the cylinder (2), a programmable control device (12), an automaton (31) which controls said pincer according to the position of the piston (1) in the cylinder (2), a microcontroller 916), having input ports (18, 19, 20) respectively connected to said sensors (11, 15) and at least an output port (21) connected, via a digital link, to the automation, said control device (12) having at least a memory wherein data calculated by said control device (12) are stored or received from the automaton (31), said data being representative of predetermined positions of the piston 91) in the cylinder (2), said control device (12) supplying validation signals to the automaton (31), said validation signals being in a first state when the piston (1) stops in a position in which the signals delivered by the sensors (11, 15) correspond to data that has been previously stored in the control device memory, and being in a second state when the piston (1) stops in a second position in which the signals delivered by the sensors (11, 15) do not correspond to data previously stored in the control device memory.

3. An assembly according to claim 1, wherein the control device (12) is mounted on an electronic board fixed inside a lodging (19) provided in said cylinder (2).

* * * * *